United States Patent Office 3,547,842
Patented Dec. 15, 1970

3,547,842
FLAME-RETARDANT POLYURETHANES
John Harvey Bright and Joseph Frederick Cannelongo, Piscataway, N.J., assignors to American Cyanamid Company, Stamford, Conn., a corporation of Maine
No Drawing. Continuation-in-part of application Ser. No. 571,180, Aug. 9, 1966. This application Aug. 5, 1969, Ser. No. 847,722
Int. Cl. C08g 22/16
U.S. Cl. 260—2.5                                6 Claims

ABSTRACT OF THE DISCLOSURE

Polyurethane foams produced from an organic polyisocyanate and a polyol and containing a flame-retarding amount of a benzyl phosphonate, are disclosed.

CROSS-REFERENCES TO RELATED APPLICATIONS

This application is a continuation-in-part of our copending application, Ser. No. 571,180, filed Aug. 9, 1966 and entitled Flame-Retardant Polyurethanes and now abandoned.

BACKGROUND OF THE INVENTION

Polyurethane resin foams are useful in a multiplicity of applications for which other foams have been found inadequate. One disadvantage of these polyurethanes, however, is their flammability. Efforts to produce polyurethane foams which do not burn have met with little oh no success. For instance, polyurethane resins have been produced by reacting the resin components with flame-retarding materials to chemically combine the materials with the polyurethane and thereby render the resins inflammable (see U.S. Pat. Nos. 3,325,569; 3,214,- 394; 3,214,395; 3,214,396). This method reduces the tendency of the resin to burn, but materially affects the other desirable properties thereof. Additionally, various known flame-retardant materials have been physically admixed with the polyurethane resins (see U.S. Pat. Nos. 3,230,193 and 3,027,349) in an attempt to produce flame-resistant compositions. While this technique has been effective in some instances in reducing the rate of flame propagation, it generally does not result in self-extinguishing products. Conversely, other additives added in this manner produce self-extinguishing products but require excessive concentrations which also detract from the desirable characteristics of the ultimate products.

SUMMARY

We have now found that polyurethane foams can be produced, which foams are flame-retardant, i.e. are either non-burning or self-extinguishing, by the incorporation therein of a non-reactive benzyl phosphonate. Our invention enables such foams to unexpectedly retain their otherwise desirable properties in addition to the flame-retardancy imparted by the benzyl phosphonates.

DESCRIPTION OF THE INVENTION INCLUDING PREFERRED EMBODIMENTS

The improved properties of the products of the present invention are obtained by the incorporation, into the foam, of various non-reactive benzyl phosphonates having the formula (I) 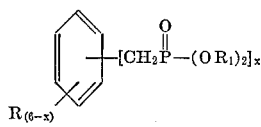

wherein each R is, individually, hydrogen, a lower alkyl radical of 1–4 carbon atoms, inclusive, a halogen or a lower haloalkyl radical of 1–4 carbon atoms, inclusive, $R_1$ is a lower alkyl or lower haloalkyl radical of 1–4 carbon atoms, inclusive, $x$ is a whole positive integer of from 1–4, inclusive, and at least one R contains a halogen atom.

The polyurethane resin compositions of the instant invention may be produced by any known method. That is to say, the "one-shot," total prepolymer, semi-prepolymer or any other method may be used. In the so-called one-shot procedure, the polyol, catalyst, if desired, and non-reactive fire-retardant (and blowing agent and surfactant if foams are being produced) are incorporated in one package and stored until used. The isocyanate reactant is incorporated and stored in a second package. Then, when ready for use, the two packages are mixed in a suitable apparatus and the resin is produced automatically. As mentioned above, well-known total prepolymer and semi-prepolymer processes for the preparation of polyurethanes may also be employed, if desired. In the former method, all of the polyol is reacted with the isocyanate and subsequently, if a foam is being produced, addition of catalyst, if desired, surfactant, and blowing agent is made. At this point, the non-reactive flame-retardant is also added. In the latter method, a prepolymer is first formed by mixing part of the polyol with the isocyanate. The catalyst, if desired, surfactant, blowing agent (if foams are being produced), and non-reactive flame-retardant are blended with the remaining polyol. The resin is then produced by reacting the prepolymer with the polyol containing the other ingredients. It can be seen that a catalyst need not be employed in the production of polyurethane resins and therefore the catalyst is not a critical part of the instant compositions.

As can be seen, the flame-retardant phosphonates are not reacted with the components of the polyurethane foam. They are, however, present as non-reactive additives to the resultant polyurethane foam. Moreover, they are present in the body of the foam per se and not merely in the pores thereof. As such, they function in a flame-retarding manner but do not deleteriously interfere with or detract from the other desirable properties of the polyurethane foam.

The compounds of Formula I above, provide excellent self-extinguishing and non-burning polyurethane resins or foams when non-reactively incorporated therein and are effective at low concentrations. It is surprising that this specific class of compounds should be so highly effective in producing flame-retardancy in polyurethane resins when other compounds that are closely related thereto in structure are ineffective. It is also surprising that this class of compounds should be effective at such low concentrations in view of the normal high concentration requirements for flame-retardants in general.

Any of the polyols useful in the preparation of polyurethanes may be employed in the practice of the present invention. Among the reactive organic polyfunctional polyols employed in preparing one class of polyurethane resins used in the practice of our invention by reaction with a suitable isocyanate compound are the polyalkylene ether, thioether and ether-thioether glycols represented by the general formula (II)     

wherein $R_2$ represents the same or different alkylene radicals containing up to about 10 carbon atoms, X represents oxygen or sulfur, and $n$ is an integer large enough so that the molecular weight of the polyalkylene ether, thioether, or ether-thioether glycol is at least about 500, e.g., from about 500 to about 10,000. The polyalkylene ether glycols included within this general formula, such as polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like, are preferred.

Polyalkylenearylene ether, thioether and ether-thioether glycols which also have molecular weights ranging from about 500 to about 10,000 but which differ from the above-described polyalkylene glycols in having arylene radicals, such as phenylene, naphthylene and anthrylene radicals, either unsubstituted or substituted, e.g., with alkyl or aryl groups, and the like, in place of some of the alkylene radicals of said polyalkylene glycols may also be employed. Polyalkylenearylene gycols of the type ordinarily used for this purpose will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane resins useful in the practice of the present invention. While the preparation of polyesters suitable for this purpose has been described in great detail in the prior art and forms no part of the present invention per se, it may be mentioned here by way of illustration that polyesters of this type may be prepared by the condensation of a polyhydric alcohol, generally a saturated aliphatic diol such as ethylene glycol, propanediol-1,2, propanediol-1,3, butanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, and the like, as well as mixtures of such diols with each other and with minor amounts of polyols having more than two hydroxyl groups, preferably saturated aliphatic polyols such as glycerol, trimethylol ethane, trimethylol propane, pentaerythritol, sorbitol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, sebacic, malic, phthalic, cyclohexanedicarboxylic and endomethylene tetrahydro phthalic acids and the like and their isomers, homologs, and other substituted derivatives, e.g., chloro-derivatives, or with mixtures of such acids with each other and with unsaturated dicarboxylic acids or anhydrides such as maleic, fumaric, citraconic and itaconic acids, and the like, as well as with polycarboxylic acids containing three or more carboxyl groups, such as aconitic acid and the like.

The essentially linear polyesters commonly used in preparing polyurethane resins preferably have molecular weights ranging from about 750 to about 3,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxyl numbers, e.g. from about 30 to about 700. When preparing these polyesters, an excess of polyol over polycarboxylic acid is generally used to insure that the resulting essentially linear polyester chains contain a sufficient amount of reactive hydroxyl groups.

Another class of suitable organic polyfunctional polyol reactants includes polyalkylene ether polyols containing more than two reactive hydroxyl groups, such as polyalkylene ether triols, tetrols, and the like, which are prepared, for example, by reacting polyols such as glycerol, trimethylol ethane, trimethylol propane, pentaerythritol, dipentaerythritol, sorbitol, 4-O-B-D-galactosyl-D-glycitol, sucrose, glucose and the like, with lower alkylene oxides such as ethylene oxide, propylene oxide and the like.

Nitrogen-containing polyfunctional polyols may also be used as polyol reactants. Among such materials there are included the polyesteramides conventionally employed in the preparation of polyurethane resins, i.e., those having molecular weights ranging from about 750 to about 3,000, acid numbers ranging from about 60 as a maximum to as low as can be practicably obtained, e.g., 2 or less, and hydroxyl numbers ranging from about 30 to about 700, and also high molecular weight polyamino alcohols, such as hydroxy-propylated alkylene diamines of the general formula (III)  $(HOH_6C_3)_2N\text{---}R^3\text{---}N(C_3H_6OH)_2$ wherein $R^3$ represents an alkylene radical having from 2 to 6 carbon atoms, inclusive, of which N,N,N',N'-tetrakis(2-hydroxypropyl)-ethylenediamine is a representative species, as well as higher analogs thereof, such as hydroxypropylated polyalkylenepolyamines of the general formula

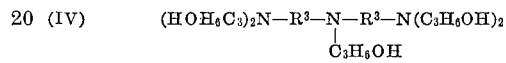

wherein $R^3$ is as defined hereinabove (see U.S. Pat. No. 2,697,118 to Lundsted et al.).

As can be readily appreciated, mixtures of the various reactive organic polyfunctional polyols described hereinabove may also be employed in preparing polyurethane resins useful in the practice of the present invention.

Just as in the case of the polyol reactant, polyurethane resins may be prepared using a wide variety of organic polyisocyanates, among which there are included aromatic diisocyanates, such as m-phenylenediisocyanate, p-phenylenediisocyanate, 4 - t - butyl-m-phenylenediisocyanate, 4-methoxy-m-phenylenediisocyanate, 4-phenoxy-m-phenylenediisocyanate, 4-chloro-m-phenylenediisocyanate, toluenediisocyanates (either as a mixture of isomers, e.g., the commercially available mixture of 80% 2,4-toluenediisocyanate and 20% 2,6-toluenediisocyanate, or as the individual isomers themselves), m-xylylenediisocyanate, p-xylylenediisocyanate, cumene-2,4-diisocyanate, durenediisocyanate, 1,4-naphthylenediisocyanate, 1,5 - naphthylenediisocyanate, 1,8-naphthylenediisocyanate, 2,6-naphthylenediisocyanate, 1,5 - tetrahydronaphthylenediisocyanate, p,p'-diphenyldiisocyanate, diphenylmethane-4,4'-diisocyanate, 2,4-diphenylhexane-1,6-diisocyanate, "bitolylenediisocyanate" (3,3' - dimethyl - 4,4'-biphenylenediisocyanate), "dianisidinediisocyanate" (3,3'-dimethoxy-4,4'-biphenylenediisocyanate), and polymethylenepolyisocyanates represented by the general formula (V) 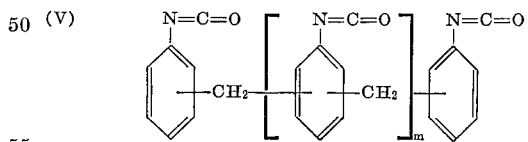

wherein $m$ represents an integer between 0 and about 5, and the like; aliphatic diisocyanates, such as methylenediisocyanate, ethylenediisocyanate, the tri-, tetra-, penta-, hexa-, hepta-, oct-, non- and decamethylene-$\omega,\omega'$-diisocyanates, 2-chlorotrimethylenediisocyanate, 2,3-dimethyltetramethylenediisocyanate, and the like, and tri- and higher isocyanates, such as benzene-1,3,5-triisocyanate, toluene-2,4,6-triisocyanate, diphenyl-2,4,4' - triisocyanate, triphenylmethane-4,4',4''-triisocyanate, and the like. Mixtures of two or more of such organic polyisocyanates may also be employed to prepare the polyurethane resins by reaction with the ethers and esters described above utilizing procedures well known to those skilled in the art, see for example, U.S. Patents 2,729,618, 3,016,364 and the like.

Any of the conventional catalysts may be incorporated into the compositions claimed herein if desired or necessary to increase the reactivity rate of the reactants. For example, tetramethylguanidine, N-methyl morpholine, N-ethyl morpholine, 1,2,4-trimethylpiperazine, trimethyl amine, triethyl amine, tributyl amine and other trialkyl amines, the esterification product of 1 mole of adipic acid and 2 moles of diethylethanolamine triethyl amine citrate, 3-morpholinopropionamide, 1,4 - bis(2-hydroxypropyl)-2-methylpiperazine, 2-diethylamino acetamide, 3-diethyl-aminopropionamide, diethylethanolamine, triethylenediamine, N,N,N'-tetrakis - (2 - hydroxypropyl)ethylenediamine (Quadrol), N,N'-dimethylpiperazine, N,N-dimethylhexahydroaniline, tribenzylamine, sodium phenolate and the like may be used. One can also use tin compounds, e.g., hydrocarbon tin acylates such as dibutyltin dilaurate, dibutyltin diacetate, dibutyltin dioctoate, tributyltin monolaurate, dimethyltin diacetate, dioctyltin diacetate, dilauryltin diacetate, dibutyltin maleate, hydrocarbon tin alkoxides, e.g., dibutyltin diethoxide, dibutyltin dimethoxide, diethyltin dibutoxide as well as other tin compounds, e.g., octylstannoic acid, trimethyltin hydroxide, trimethyltin chloride, triphenyltin hydride, triallyltin chloride, tributyltin fluoride, dibutyltin dibromide, bis(carboethoxymethyl) tin diiodide, tributyltin chloride, trioctyltin acetate, butyltin trichloride, octyltin tris (thiobutoxide), dimethyltin oxide, dibutyltin oxide, dioctyltin oxide, diphenyltin oxide, stannous octanoate, stannous-oleate, and the like.

Any conventional surfactant may be used to produce the instant foams. In general, those surfactants which are neither anionic nor contain active hydroxyl groups may be used. For example, those based on dimethyl polysiloxane and polyoxysiloxanes and particularly those prepared with ethylene oxide and mixtures of ethylene oxide and propylene oxide, are advantageous.

Similarly, any foaming agent commonly used in the art can be employed. Suitable foaming agents are those materials capable of liberating gaseous products when heated, or when reacted with an isocyanate. The preferred foaming agents are the fluorochlorocarbons boiling in the range of twenty to fifty degrees centigrade, and mixtures thereof, for example, trichlorofluoromethane, trichlorotrifluoroethane, dichloromonofluoromethane, monochloromonofluoroethane, difluoromonochloroethane and difluorodichloroethane.

Another foaming system which can be used is that comprised of tertiary alcohols in the presence of strong, concentrated acid catalysts such as is disclosed and claimed in U.S. Pat. No. 2,865,869. Examples of tertiary alcohols include: tertiary amyl alcohol; tertiary butyl alcohol; and the like. Examples of catalysts include sulfuric acid; phosphoric acid; sulfonic acid; and aluminum chloride, etc. In addition, various secondary alcohols can be used such as: 1-phenyl-1,2-ethanediol; 2-butanal; and 2-methyl-2,4-pentanediol and the like, preferably with strong, concentrated acid catalysts as above. Other foaming agents that can be used include the following: polycarboxylic acids; polycarboxylic acid anhydrides; dimethylol ureas, polymethyl phenols; formic acid and tetrahydroxymethylphosphonium chloride. In addition, mixtures of the above foaming agents may be employed.

Any amount of the compound of Formula I, above which will impart flame-retardance, i.e. flame-retarding amounts, may be employed in the practice of the present invention. In general, the amount of flame-retardant will vary from about 1 to about 25%, based on the weight of the polyol, with the range of 2.5 to 15%, same basis, being preferred. In instances where the particular polyol employed produces a polyurethane of self-extinguishing properties, the flame-retardants of the present invention may be incorporated therein to produce non-burning foams. In other cases, where the polyol does not produce polyurethanes of any flame-resistance, the compounds of the present invention may be incorporated therein to produce self-extinguishing or non-burning properties, depending to some extent upon the amount of compound added.

As mentioned above, the compounds represented by Formula I, above, impart excellent flame-proofing properties when admixed with polyurethane resin foams. These compounds may be produced according to the Michaelis-Arbuzov Reaction wherein an appropriately substituted benzyl halide is reacted with a correspondingly appropriately substituted phosphite according to the equation:

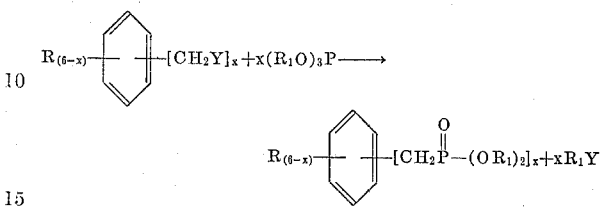

wherein Y is a halogen and R, $R_1$, and x are as defined above in regard to Formula I. General reactions of this type are disclosed in Organic Reactions, vol. III, pg. 273, Wiley and Sons, New York, 1951. The reaction is conducted from about 70° C. to 250° C., preferably from about 135° C. to 185° C., at atmospheric pressure. Higher or lower pressures, however, may be used. The reaction is preferably conducted in an inert atmosphere, such as, nitrogen, carbon dioxide, neon etc. for from about 1 to 10 hours, preferably about 4 to 6 hours.

The concentration of benzyl halide to phosphite should range from about 1:1 to about 1:4, depending upon the specific product to be produced. For example, if it is decided to produce a compound having two

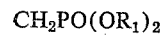

groups, twice the amount of phosphite would be used. Likewise, a compound possessing four $CH_2PO(OR_1)_2$ groups would be produced from 1 part of halide and four parts of phosphite.

The reactants, upon heating, are refluxed through a Vigreaux column into a total reflux, partial take-off distillation head, such that the more volatile halide by-product can be separated from the reactants and removed without losing unreacted starting material.

Polyurethane foams, whether rigid or flexible, have a variety of uses. They are used widely as insulating media for a variety of articles of manufacture wherein advantage is taken of their ability to foam in place, such as between the metal surfaces involved in the construction of refrigerators. Certain other uses depend to some extent upon the degree of flame-retardance possessed by the polyurethane foam involved. Such uses include undercoatings for bridges to reduce surface freezing, insulation for commercial apparatus such as stoves, ovens, etc. in homes and other buildings, etc., wherein nonburning properties are required. This invention will promote the use of polyurethane foams in general, and in those areas where flame-retardance is important, in particular.

The following examples are set forth for purposes of illustration only and are not to be construed as limiting the instant invention except as set forth in the appended claims. All parts and percentages are by weight unless otherwise specified.

Example A.—Synthesis of bis(2-chloroethyl)benzyl-phosphonate 100 parts of benzylchloride and 105 parts of tris(2-chloroethyl)phosphite are heated to a boil under a nitrogen atmosphere in a suitable reaction vessel fitted with a total reflux partial take-off head. As the by-product is collected as distillate, the reaction increases to 208° C. After 6 hours, the reaction is complete. The product is isolated by vacuum distilling the residue through a Claisen head. After a forerun, the product is recovered in a 60% yield. It has a boiling point of 180–192° at 0.5 mm. Hg.

Example B.—Synthesis of bis(2-chloromethyl)-o-chlorobenzylphosphonate

The procedure of Example A is again followed except that 100 parts of o-chlorobenzyl chloride are reacted with 102 parts of tris(2-chloroethyl)phosphite at a temperature of 110–144° C. for 18 hours. A yield of 20% of the subject compound having a boiling point of 143–175° C. at 0.2 mm. Hg is recovered.

Example C.—Synthesis of bis(2-chloroethyl)-p-bromobenzylphosphonate

The procedure of Example A is again followed except that 100 parts of p-bromobenzyl bromide are reacted with 100 parts of tris(2-chloroethyl)phosphite at 155–255° C. for 2 hours. 90% of the subject compound is recovered.

Example D.—Synthesis of tetrakis(2-chloroethyl)-5-bromomethyl-2,4,6-trimethyl-m-xylylbiphosphonate The procedure of Example A is again followed except that 50 parts of tris(bromomethyl)mesitylene are reacted with 102 parts of tris(2-chloroethyl)phosphite at 90–150° C. for 2 hours. The subject compound is recovered in a yield of 90%.

Example 1

To a suitable reaction vessel are added 10.0 parts of a sorbitol-propylene oxide adduct (OH No. 440–460), 1.5 parts of diethyl-o-chlorobenzylphosphonate, 0.2 part of tetramethylguanidine, 0.2 part of a commercially available silicone surfactant and 3.0 parts of trichlorofluoromethane. The ingredients are blended for 15 seconds and then 10.7 parts of polymethylene polyphenylisocyanate are added. The resultant media is then blended for 15 seconds and the contents are quickly transferred to a mold. The resultant polyurethane resin foams almost immediately. The cream time is 15 seconds, the rise time 120 seconds and the tack-free time 140 seconds. The foam has a density of 2.0 lb./ft.

The foam is tested to determine flammability according to D–1692–59T except that the test specimen is 1 x 0.5 x 5 inches. The ratings of flammable, self-extinguishing and nonburning are assigned according to the above test. The foam of Example 1 is designated as self-extinguishing.

Following the procedure of Example 1, various other flame-retardants are added to polyurethane resins. The results are set forth in Table I, below.

TABLE I

| Example | Polyurethane | Phosphonate—parts | Flame-test designation |
|---|---|---|---|
| 2 (comp.) | Same as Ex. 1 | None | Free-burning. |
| 3 | do | Bis(2-chloroethyl)-o-chlorobenzylphosphonate—1.5 | Self-extinguishing. |
| 4 | do | Bis(2-chloroethyl)-p-bromobenzylphosphonate—1.5 | Do. |
| 5 | do | $\alpha^1,\alpha^3$-bis[bis(2-chloroethyl)phosphonyl]-$\alpha^5$-bromohexamethylbenzene—1.5. | Do. |
| 6 | do | Bis(4-iodobutyl)-o-butyl-p-bromomethylbenzylphosphonate—1.5. | Do. |
| 7 | do | Bis(1-bromopentyl)-o-fluoromethylbenzylphosphonate—1.5. | Do. |
| 8 | do | 1-(2-bromoethylphosphonyl)-2,3,4,5,6-pentachloromethylbenzene—5.0. | Do. |
| 9 | do | Diethyl-o-chlorobenzylphosphonate—1.5 | Do. |
| 10 | do | Diethyl-(mixed)-dichlorobenzylphosphonate—1.5 | Do. |
| 11 | do | Diethyl-p-bromobenzylphosphonate—1.5 | Non-burning. |
| 12 (comp.) | do | Diethylbenzylphosphonate—1.5 | Free-burning. |
| 13 (comp.) | do | Dipolyoxypropylenephenylphosphonate—1.5 | Do. |
| 14 (comp.) | do | Diallyl allylphosphonate—1.5 | Do. |
| 15 (comp.) | do | Dipolyoxypropylenechloromethylphosphonate—1.5 | Do. |
| 16 (comp.) | do | Diallylchloromethylphosphonate—1.5 | Do. |
| 17 (comp.) | do | Diethylchloromethylphosphonate—1.5 | Do. |
| 18 | do | Diethyl-2,5-dibromobenzylphosphonate—1.5 | Non-burning. |
| 19 | Polyester based (90/10 ethylene glycol/propylene glycol adipate)-isocyanate of Example 1. | Bis(2-chloroethyl)-o-chloromethyl-p-butylbenzylphosphonate—5.0. | Self-extinguishing. |
| 20 | do | Dimethyl-o-chloro-m-methyl-p-chloromethylbenzylphosphonate—7.5. | Do. |
| 21 | do | $\alpha^1,\alpha^2,\alpha^3,\alpha^5$-tetrakis(diethylphosphonyl)-($\alpha^4,\alpha^6$-dibromo)-hexamethylbenzene—5.0. | Do. |
| 22 | Polyether based (polytetramethylene oxide type)-isocyanate of Example 1. | $\alpha^1,\alpha^3$-bis(dibutylphosphonyl)-$\alpha^4,\alpha^6$-dichlorodurene—3.5 | Do. |
| 23 | do | $\alpha^1,\alpha^3,\alpha^5$-tris(dimethylphosphonyl)-2,4-bis(2-chloroethyl)mesitylene—4.5 | Do. |
| 24 | do | $\alpha^1,\alpha^2,\alpha^4,\alpha^5$-tetrakis(dimethylphosphonyl)-$\alpha^3$-chloropentamethylbenzene—3.0. | Do. |
| 25 | do | bis(2,3-dibromopropyl)-p-bromobenzylphosphonate—6.0. | Do. |

Comp.=Comparative.

The structural formulae of the compounds (phosphonates) used in Examples 5, 8, 10, 13, 15, 21, 22, 23 and 24, being somewhat complex, are set forth hereinbelow for purposes of clarification.

The phosphonate used in Example 5, i.e. $\alpha^1,\alpha^3$-bis[bis(2-chloroethyl)phosphonyl]-$\alpha^5$-bromohexamethylbenzene:

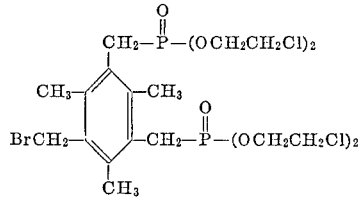

The phosphonate used in Example 8, i.e. 1-(2-bromoethylphosphonyl)-2,3,4,5,6-pentachloromethylbenzene:

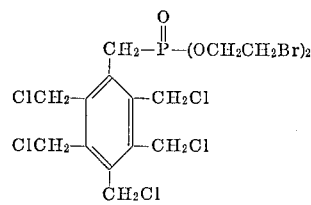

The phosphonate used in Example 10, i.e. a diethyl-(mixed)dichlorobenzylphosphonate:

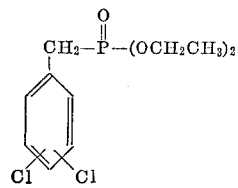

The phosphonate used in Example 13, i.e. dipolyoxy-propylenephenylphosphonate:

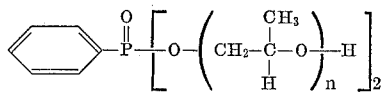

The phosphonate used in Example 15, i.e. dipolyoxy-propylenechloromethylphosphonate:

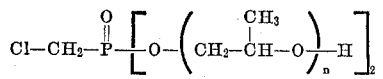

The phosphonate used in Example 21, i.e. $\alpha^1,\alpha^2,\alpha^3,\alpha^5$-tetrakis(diethylphosphonyl)($\alpha^4,\alpha^6$-dibromo)hexamethylbenzene:

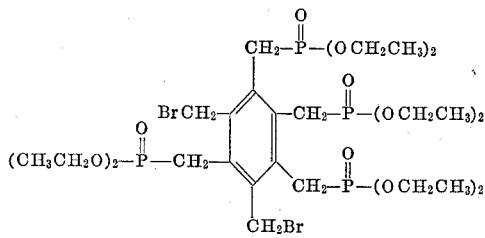

The phosphonate used in Example 22, i.e. $\alpha^1,\alpha^3$-bis(dibutylphosphonyl)-$\alpha^4,\alpha^6$-dichlorodurene:

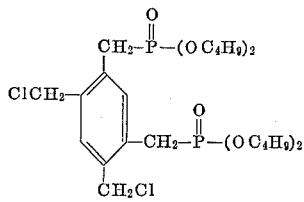

The phosphonate used in Example 23, i.e. $\alpha^1,\alpha^3,\alpha^5$-tris(dimethylphosphonyl)-2,4-bis(2-chloroethyl)mesitylene:

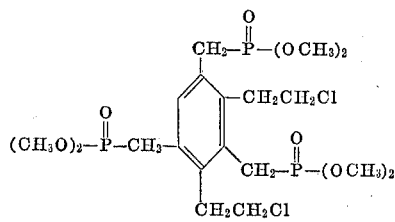

The phosphonate used in Example 24, i.e. $\alpha^1,\alpha^2,\alpha^4,\alpha^5$-tetrakis(dimethylphosphonyl) - $\alpha^3$ - chloropentamethylbenzene:

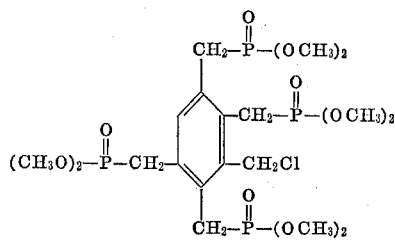

We claim:
1. A flame-retardant polyurethane foam consisting of essentially of the reaction product of (1) an organic polyisocyanate and (2) a polyol having a molecular weight of at least about 500, having non-reactively contained therein (3) a flame-retarding amount of a benzyl phosphonate having the formula

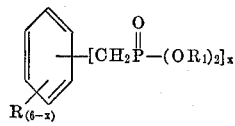

wherein each R is individually selected from the group consisting of hydrogen, a lower alkyl radical of 1–4 carbon atoms, inclusive, a halogen radical and a haloalkyl radical of 1–4 carbon atoms, inclusive, $R_1$ is selected from the group consisting of a lower alkyl radical of 1–4 carbon atoms, inclusive, and a haloalkyl radical of 1–4 carbon atoms, inclusive, $x$ is a whole positive integer of from 1–4, inclusive, and at least one R contains a halogen atom.

2. A foam according to claim 1 wherein said benzyl phosphonate is (bis(2 - chloroethyl)-o-chlorobenzylphosphonate.

3. A foam according to claim 1 wherein said benzyl phosphonate is bis(2-chloroethyl)-p-bromobenzylphosphonate.

4. A foam according to claim 1 wherein said benzyl phosphonate is tetrakis(2-chloroethyl) - 5 - bromomethyl-2,4,6-trimethyl-m-xylylbiphosphonate.

5. A foam according to claim 1 wherein said benzyl phosphonate is diethyl-o-chlorobenzylphosphonate.

6. A foam according to claim 1 wherein said benzyl phosphonate is diethyl-p-bromobenzyl phosphonate.

References Cited

UNITED STATES PATENTS

| 3,257,337 | 6/1966 | Schoepfle et al. | 260—2.5 |
| 3,400,085 | 9/1968 | Kujawa et al. | 260—2.5 |

FOREIGN PATENTS

| 930,397 | 7/1963 | Great Britain | 260—2.5 |
| 1,012,653 | 12/1965 | Great Britain | 260—2.5 |
| 1,020,310 | 2/1966 | Great Britain | 260—2.5 |
| 1,028,158 | 5/1966 | Great Britain | 260—FP |
| 1,213,171 | 3/1960 | France | 260—FP |

OTHER REFERENCES

Japanese Patent Specification Publication No. 39-3997, all pages (8 in number) cited (1964).

HOSEA E. TAYLOR, Primary Examiner

M. J. WELSH, Assistant Examiner

U.S. Cl. X.R.

260—75, 77.5